US009645582B2

(12) United States Patent
Shue

(10) Patent No.: US 9,645,582 B2
(45) Date of Patent: May 9, 2017

(54) LANDING AIRCRAFTS WITH OPTIMAL LANDING SPOT SELECTION

(71) Applicant: Bell Helicopter Textron Inc., Fort Worth, TX (US)

(72) Inventor: ShyhPyng Jack Shue, Grapevine, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 0 days.

(21) Appl. No.: 14/750,746

(22) Filed: Jun. 25, 2015

(65) Prior Publication Data

US 2016/0378121 A1  Dec. 29, 2016

(51) Int. Cl.
G05D 1/10 (2006.01)
G05D 1/00 (2006.01)

(52) U.S. Cl.
CPC ........... G05D 1/105 (2013.01); G05D 1/0072 (2013.01); G05D 1/102 (2013.01)

(58) Field of Classification Search
CPC ....... G05D 1/105; G05D 1/102; G05D 1/0072
USPC .......................................................... 701/7
See application file for complete search history.

(56) References Cited

U.S. PATENT DOCUMENTS 6,154,693 A   11/2000 Aberschitz
7,976,310 B2   7/2011 Bachelder et al.
8,646,719 B2   2/2014 Morris et al.
9,242,727 B1 * 1/2016 Alvarez ................ B64C 27/006
2011/0264312 A1 * 10/2011 Spinelli ................ G08G 5/0021
701/16

OTHER PUBLICATIONS

TUDelft—Delft Center for Systems and Control: "Automatic Autorotation of a Rotorcraft Unmanned Aerial Vehicle (UAV)"; http://www.dcsc.tudelft.nl/Research/Current/matrix-27-iobxbzsbmo-1144233502-921d.html; retrieved from the internet on Apr. 6, 2015, 2 pages.
Konstantinos Dalamagkidis; Autonomous Vertical Autorotation for Unmanned Helicopters, Jul. 30, 2009; 145 pages; retrieved from http://scholarcommons.usf.edu/cgi/viewcontent.cgi?article=2920 &context=etd.
Wind Field Estimation for Small Unmanned Aerial Vehicles, Jack W. Langelaan, Nicholas Alley and James Neidhoefer, AIAA Guidance, Navigation and Control Conference, Toronto, Canada, 2010, AIAA paper 2010-8177.

* cited by examiner

Primary Examiner — Anne M Antonucci

(57) ABSTRACT

Methods, systems, and apparatus, including computer programs encoded on a computer storage medium, for landing aircrafts with optimal landing spot selection. In one aspect, a method includes initiating an autorotation of an aircraft in response to detecting all engine failure, determining a plurality of flight characteristics and conditions of the aircraft at a time of initiating the autorotation, the plurality of flight characteristics and conditions comprising an aircraft altitude, an aircraft velocity, and wind direction, determining total air-time for glideslope and flare control, and a geographic area within which to land the aircraft by autorotation based on the plurality of flight characteristics and conditions, and controlling the aircraft to land the aircraft by autorotation within the geographic area.

20 Claims, 12 Drawing Sheets

LANDING AIRCRAFTS WITH OPTIMAL LANDING SPOT SELECTION

TECHNICAL FIELD

This disclosure relates to landing aircrafts, e.g., with optimal landing spot selection.

BACKGROUND

Aircrafts, e.g., rotorcrafts, helicopters, vertical take-off and landing (VTOL) vehicles such as autonomous aerial vehicles (UAVs), or other VTOL compound vehicles such as X2 and X3 types of aircrafts, can experience crash-causing events such as engine failure with/without pilot incapacitation. In such situations, the aircrafts can be landed by autorotation. Autorotation is a state of flight where a main rotor system of an aircraft turns by an action of air moving up through the rotor rather than engine power driving the rotor. Some aircrafts such as helicopters can have an ability to auto-rotate and safely land in the event of engine failure, e.g., for pre-determined conditions and locations. However, safe landing by autorotation can require selecting a landing spot, choosing a flight path to the landing spot, avoiding dynamic obstacles in real time when implementing the autorotation, and managing rotor energy.

SUMMARY

This disclosure describes technologies relating to automatically landing aircrafts with optimal landing spot selection. Such technologies can be used for unmanned, optionally manned, or manned flights.

In general, one innovative aspect of the subject matter described in this specification can be embodied in methods that include the actions of initiating an autorotation of an aircraft in response to detecting engine failure, determining a plurality of flight characteristics and conditions of the aircraft at a time of initiating the autorotation, the plurality of flight characteristics and conditions comprising an aircraft altitude, an aircraft velocity, and wind direction, determining a geographic area within which to land the aircraft by autorotation based on the plurality of flight characteristics and conditions, and controlling the aircraft to land the aircraft by autorotation within the geographic area while performing obstacle avoidance in flight path. Other implementations of this aspect include corresponding systems, apparatus, and computer programs, configured to perform the actions of the methods, encoded on computer storage devices.

These and other implementations can each optionally include one or more of the following features. For instance, controlling the aircraft to land the aircraft by autorotation within the geographic area can include estimating and determining a total air-time from the time of losing engines based at least in part on the plurality of flight characteristics and conditions, determining a glideslope angle and air-time for glideslope and a flare control point and flare control air-time for the aircraft based at least in part on the plurality of flight characteristics and conditions and determining a flight path along which to descend the aircraft by autorotation. In some examples, determining the flight path along which to descend the aircraft by autorotation includes storing, in a computer-readable storage device, a plurality of flight paths, a plurality of glideslope angles and a plurality of flare control points, each stored flight path associated with a corresponding stored glideslope angle and stored flare control point; and comparing the determined glideslope angle and the flare control point with the plurality of glideslope angles and the plurality of flare control points, respectively.

The method can further include monitoring the plurality of flight characteristics and conditions while controlling the aircraft to land the aircraft by autorotation to determine changes to the plurality of flight characteristics and conditions, determining changes to the glideslope angle and the flare control point based on the changes to the plurality of flight characteristics and conditions, and modifying the flight path along which to descend the aircraft by autorotation based on the changes to the glideslope angle and the flare control point. The method can also include activating an emergency control to protect ground lives and aircraft if intruders or moving objects move to the landing site based on the changes to the glideslope angle and the flare control point. The method can also include determining a presence of obstacles in the geographic area, e.g., using LINDA image scanning function and/or GPS terrain information, while controlling the aircraft to land the aircraft by autorotation and modifying the flight path along which to descend the aircraft to avoid the obstacles.

In some implementations, controlling the aircraft to land the aircraft by autorotation within the geographic area includes orienting the aircraft to face headwind based on the wind direction. Determining a geographic area within which to land the aircraft by autorotation based on the plurality of flight characteristics and conditions can include successively determining a plurality of geographic areas within which to land the aircraft while controlling the aircraft to land the aircraft by autorotation, each geographic area determined at a lower altitude relative to a preceding geographic area, each geographic area smaller than the preceding geographic area. Controlling the aircraft to land the aircraft by autorotation within the geographic area can include controlling the aircraft without pilot intervention.

Determining the plurality of flight characteristics and conditions can include receiving flight condition signals from a plurality of flight conditions sensors mounted onboard the aircraft, each flight condition sensor configured to sense at least one of the plurality of flight characteristics and conditions. In some examples, the method further includes receiving flight condition information from a data processing apparatus of a ground control station communicatively connected to the data processing apparatus.

In some implementations, determining the geographic area within which to land the aircraft by autorotation based on the plurality of flight characteristics and conditions includes determining a landing spot within the geographic area on which to land the aircraft by autorotation. The method can further include determining at least one alternative landing spot within the geographic area on which to land the aircraft by autorotation, while controlling the aircraft to land the aircraft by autorotation within the geographic area, determining that the determined landing spot is unavailable to land the aircraft, and controlling the aircraft to land the aircraft by autorotation on the alternative landing spot in response to determining that the determined landing spot is unavailable to land the aircraft.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
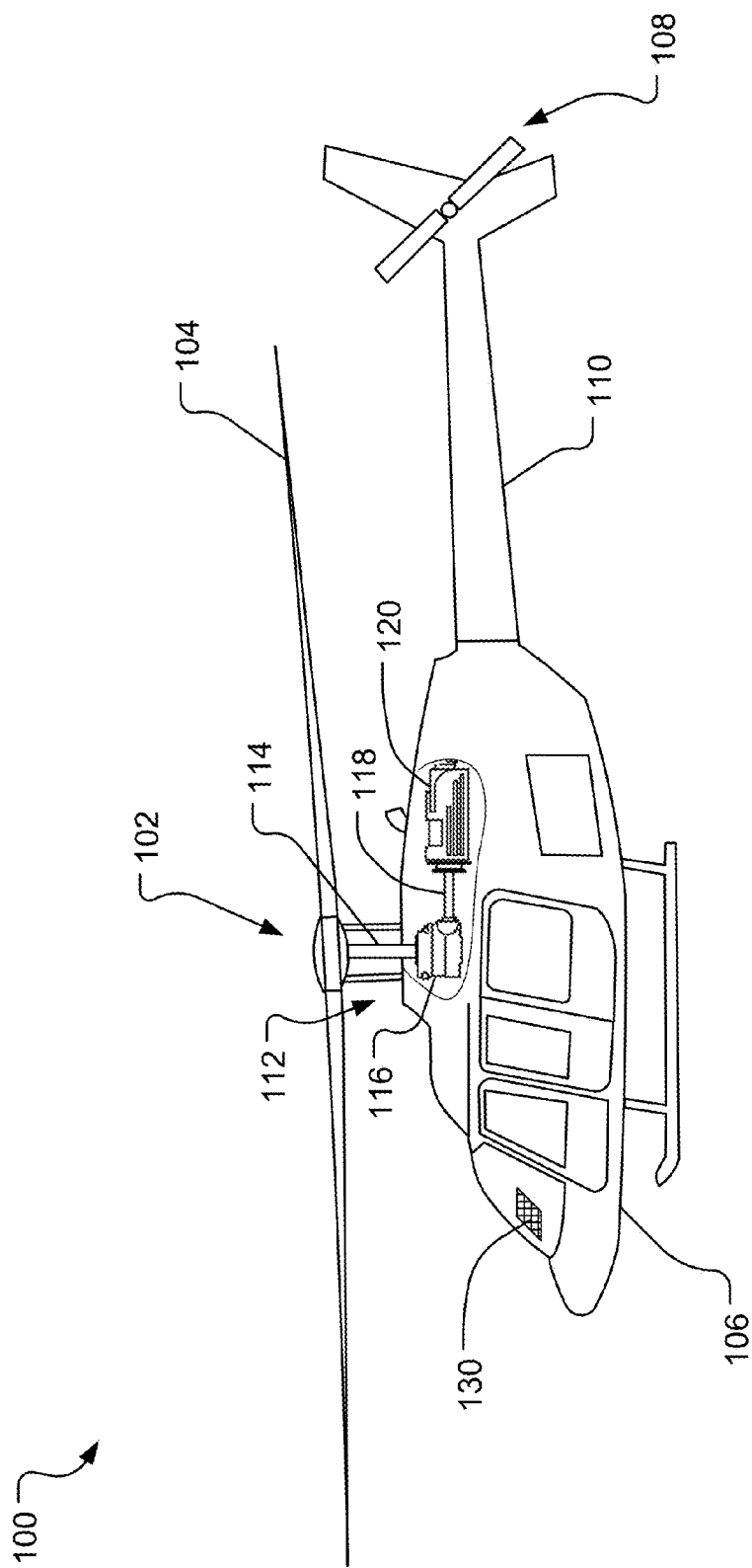
FIG. 1A is a schematic diagram of an example aircraft.

This disclosure describes a control system for landing an aircraft such as a UAV with optimal landing spot selection. The control system can provide an integrated and central control maneuver for landing the aircraft. For example, the control system can dynamically determine multi-landing spots (e.g., an optimal and a sub-optimal and alternative landing spot) and multi-flight paths (e.g., an optimal flight path and a sub-optimal and alternative flight path) with obstacle avoidance and emergency control, which enables to protect both the aircraft and ground properties and lives. In some implementations, the control system integrates autorotation with optimal landing spot selection and optimal flight path selection, which empowers the aircraft with "eyes" and "brains" for safe landing.

Autorotation maneuver can safely bring an aircraft, e.g., a VTOL type of aircraft, from the air down to the ground. Another maneuver of optimal landing spot selection is also important to safely protect the aircraft and ground properties and lives. When the aircraft engines fail, the control system can enable autonomy of autorotation to accomplish and satisfy both maneuvers including the autorotation and the optimal landing spot selection to achieve manned, optionally manned and unmanned flights, which is also beneficial to obtain certification and qualification, e.g., from commercial (e.g., Federal Aviation Administration) and/or military (e.g., the Department of Defense) agents.

In some implementations, the control system initiates an autorotation of the aircraft in response to detecting engine failure, e.g., dual-engine failure, determine a geographic area within which to land the aircraft by autorotation based on multiple flight characteristics and conditions at a time of initiating the autorotation, keep calculating an optimal landing spot based on obstacle conditions and ground properties, determine an optimal flight path, and control the aircraft to land by autorotation within the geographic area. At the last approach point, an emergency control algorithm can be used to avoid sudden intruders for lives protection.

The control system described here can be applied in any device or system requiring safe landing such as a rotorcraft, a tiltrotor aircraft, a VTOL UAV, or any other compound aircraft. The control system can be considered to empower an aircraft with "eyes" and "brains," so that, during crash-causing events, the aircraft can enable autorotation maneuver and select an optimal landing spot and an optimal flight path for the optimal landing spot to safely land. The control system enables to protect aircrafts during all engine failures and safely protect ground properties and lives during ground approaching and landing. The control system can also enable emergency intruder control for final approach to save reckless human lives. The control system can utilize standard aircraft equipment such as sensor packages and light detection and ranging (LIDAR) technology, which can be incorporated into existing aircrafts for helping autorotation landing. The control system makes UAV autorotation maneuver feasible, such that a UAV or a manned/optionally manned/unmanned aircraft can be landed in airport and no-airport environment. If a UAV is at an enemy zone and detects no way to land to a safe recovery zone, the UAV can be controlled to become a boomer to destroy itself with enemy. The control system can include standby emergency control function for controlling an aircraft in response to emergency events during autorotation landing. The control system can be utilized in different types of VTOL vehicles for manned, optionally manned or unmanned flights to increase survivability during autorotation. In some cases, the control system helps a pilot to select an optimal landing spot or an optimal flight path or both to reduce the pilot workload in autorotation. The control system described here can also help consolidating VTOL control laws (CLAWS) designs, and help Federal Aviation Administration (FAA) to define verification requirements for unmanned VTOL vehicles.

FIG. 1A shows a schematic diagram of an example of a rotorcraft 100. It should be understood that while the example rotorcraft 100 comprises a helicopter, implementations of the disclosure are not limited to any particular setting or application, and implementations can be used in any setting or application requiring autorotation landing. Such a setting or application can include, e.g., rotorcrafts, tiltrotor aircrafts, UAVs, a manned/optionally manned/unmanned air vehicle, other VTOL vehicles, to name a few.

The rotorcraft 100 has a rotor system 102 with multiple rotor blades 104. The rotorcraft 100 can further include a fuselage 106, an anti-torque system 108, and an empennage 110. The rotorcraft 100 also includes an engine 120 that provides power to the rotor system 102 and/or the anti-torque system 108. The engine 120 supplies torque to the rotor system 102 for rotating the rotor blades 104 via a gearbox system 112. The gearbox system 112 can include a mast 114, a gearbox 116, and a gearbox shaft 118. The rotorcraft 100 includes a control system 130 that controls aircraft flight. As discussed in further details below, the control system 130 can control the rotorcraft 100 for autorotation landing, when engines fail, e.g., by using standard aircraft equipment such as sensor packages and LIDAR technology.

Figure 1B:
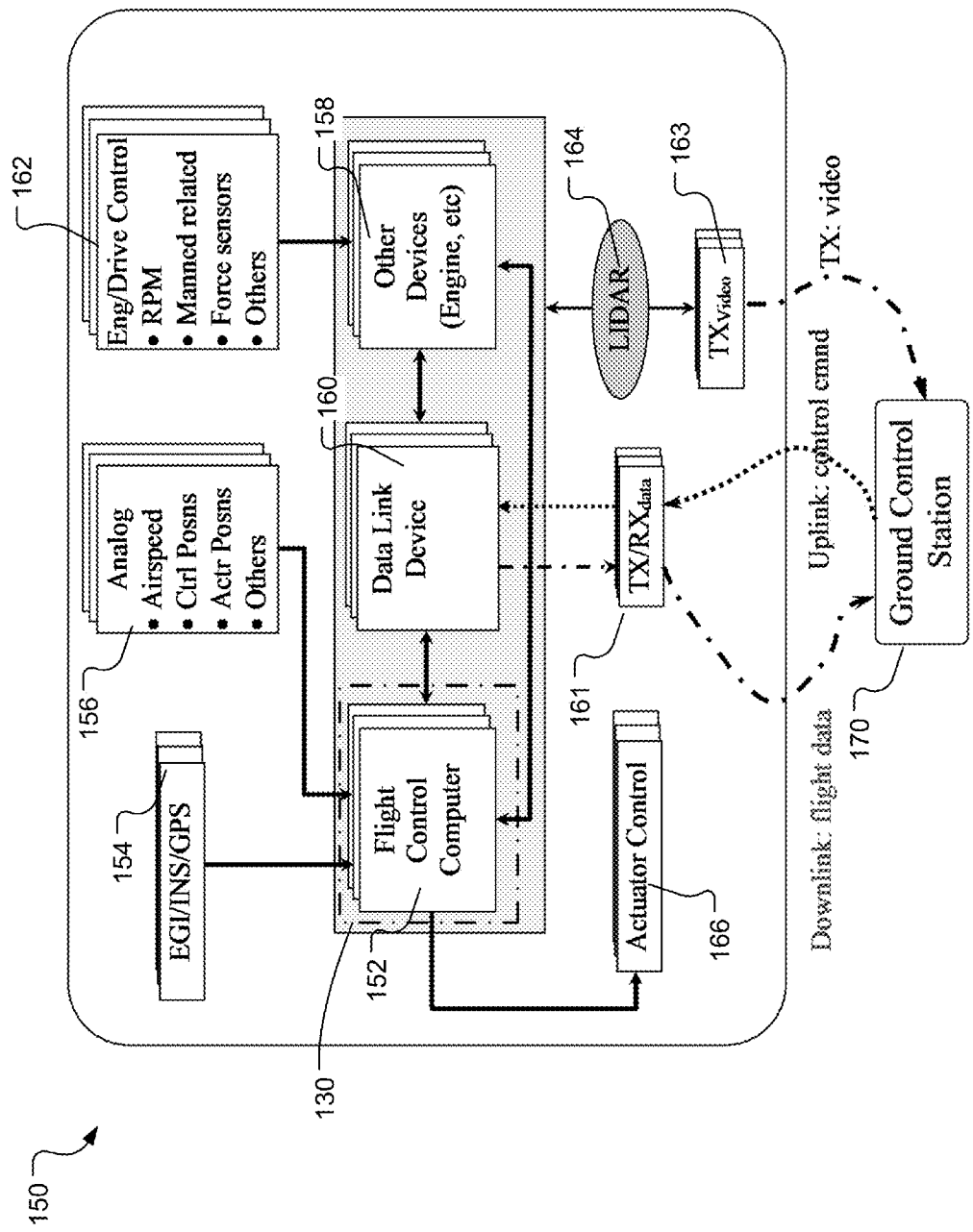
FIG. 1B is a schematic diagram of an example system configuration of the aircraft of FIG. 1A.

FIG. 1B shows a schematic diagram of a system configuration 150 of the rotorcraft 100. The control system 130 can include one or more processors and a computer-readable medium storing instructions executable by the one or more processors to perform various operations. The operations can include integrating entire maneuvers such as making decisions, calculating time to land, selecting an optimal landing spot, analyzing LIDAR 164 images, arranging flight maneuver, and managing rotor energy.

In some implementations, the control system 130 includes a flight control computer (FCC) 152. The FCC 152 can include one or more processors and a computer-readable medium storing instructions executable by the one or more processors to perform the operations. The FCC 152 can have hardware connections or software connections or both to aircraft equipment including a number of sensors and systems on the rotorcraft 100.

The FCC 152 can be connected to a navigation and positioning system 154, e.g., a Global Positioning System (GPS), an Inertial Navigation System (INS), or an embedded GPS and INS (EGI). From the navigation and positioning system 154, the FCC 152 can obtain information on longitude, latitude, altitude, terrain information, aircraft rate, acceleration or other information associated with aircraft flight (or combinations of them).

The rotorcraft 100 can include a LIDAR scanning system 164 to provide ground images for flight control and decision. In some cases, a GPS terrain system provides standard ground information, e.g., from a database, and the LIDAR scanning system 164 provides scanning information on real-time moving objects which can be placed on top of the ground terrain information. In this way, the moving and non-moving objects or obstacles on the ground can be determined and further avoided during autorotation landing. In some cases, if the GPS terrain system is not available, the LIDAR scanning system 164 can still be used to determine the terrain information and the moving objects. In some cases, if the LIDAR scanning system 164 is not available, GPS terrain system can be also used to provide terrain information for autorotation landing.

The FCC 152 can be connected to analog sensors 156 such as an airspeed sensor, a control position sensor, an air data computer (ADC) sensor, and other sensors, such as new wind speed and ground velocity determination sensors. The analog sensors 156 can provide analog airspeed and altitude information to the FCC 152. The FCC 152 can also be connected to other devices 158 through a data link device 160. The other devices 158 can include an engine, e.g., the engine 120 of FIG. 1A, a weapon system, a navigation system, a mission computer, combinations of them or other devices. The devices 158 can receive information from engine/drive control devices 162. The engine/drive control devices 162 can include revolutions per minute (RPM) sensors, force sensors, manned related sensors, or other types of sensors. The other device 158 here can be a weapon control system for unmanned combat aerial rotorcraft (UCAR) or reconfiguration control system for the system reconfiguration or health user monitor system (HUMS). From the engine/drive control devices 162 and the devices 158, the FCC 152 can obtain information on engines such as whether all engines have failed or RPM information.

In some implementations, the control system 130, e.g., the FCC 152, communicates to a ground control station 170, e.g., through the data link device 160. The FCC 152 and the ground control station 170 can exchange transmittal (TX)/receival (RX) data 161. The TX data 161 transmitted from the FCC 152 to the ground control station 170 can include flight data such as altitude, airspeed and engine conditions. The RX data 161 received by the FCC 152 from the ground control station 170 can include up-to-date information of ground control commands, guidance, navigation, and modes, and flight characteristics and conditions such as wind direction and traffic. In some cases, the ground control station 170 processes the received TX data and transmits control commands as the RX data to the FCC 152. In some implementations, the LIDAR scanning system 164 transmits video/image data 163 to the ground control station 170, and the ground control station 170 generates control commands at least partially based on the transmitted video/image data 163.

The control system 130, e.g., the FCC 152, can obtain information from the devices 154, the sensors 156, the other devices 158, the LIDAR scanning system 164, and control commands or up-to-date information or both from the ground control station 170. The control system 130 can integrate the information together and process the information for autorotation landing. In some examples, the control system 130 includes CLAWS system configured to make aircraft maneuvers, determine an optimal flight path, perform emergency control and image recognition, and make decisions based on the integrated information and control logic algorithms. The control system 130 can then transmit commands or control signals to an actuator control system 166 to execute aircraft maneuver such as autorotation landing. In some implementations, the control system 130 controls the rotorcraft 100 for autorotation landing when disconnected from the ground control station 170 due to flying in wireless denial area or with TX/RX device failure condition. The control system 130 can collect information from on-board equipment such as the devices 152, 154, the sensors 156, the devices 158, and the LIDAR scanning system 164, and control 166 the rotorcraft 100 for autorotation landing.

During autorotation, the control system 130 can perform the following operations sequentially or non-sequentially: calculating a total air-time to touchdown and determining a valid landing area based on the total air-time, aircraft altitude, and wind direction, using the LIDAR scanning system or GPS terrain system or both to determine one or more landing spots within the valid landing area for final approach, determining an optimal flight path based on terrain information, wind direction, ground obstacles, rotor energy, and other close-by landing spots around a desired landing spot, managing rotor energy for glideslope capture and flare control, activating and standing by an emergency control algorithm to avoid collision if any moving target approaches in the flight path, and integrating the entire controls for maneuver. Note that most of the above operations can occur instantly. By instantly, it is meant that a time delay between an input to perform one or more of these operations and performance of the operations can be imperceptible, e.g., in the order of milliseconds or sooner. The time delay can be affected by the system resources that perform the one or more operations. All related time delays in each control loops and devices can be considered in the control system 130.

The control system 130 can include one or more computing systems including the FCC 152. In some examples, one or more operations of the above operations are implemented by a computing system other than the FCC 152. Thus, functionalities and aircraft maneuvabilities of the FCC 152 do not affect the entire autorotation maneuver.

In response to detecting that all engines fail, the control system 130 can initiate an autorotation. The control system 130 can determine a number of flight characteristics and conditions of the rotorcraft 100 at a time of initiating the autorotation, i.e., autorotation start point or entry point. The flight characteristics and conditions can include an aircraft altitude, i.e., autorotation entry ground height, the aircraft heading, the aircraft velocity, i.e., airspeed, and wind direction.

As noted above, the control system 130 can determine the number of flight characteristics and conditions by receiving flight condition signals from a number of flight conditions sensors mounted on-board the aircraft. Each flight condition sensor can be configured to sense at least one of the diversified flight characteristics and conditions. These flight conditions and information can then be transited to the ground control station 170 to notify the ground control station of aircraft GPS location, healthy, heading to, airspeed, altitude and so on. In other examples, the control system 130 can use $RX_{data}$ 161 to receive flight commands, information and outside environmental conditions from the ground control station 170 using $TX_{data}$ 161.

Based on the number of flight characteristics and statuses, during the dual engine failure condition, the control system 130 can determine the total air-time to touchdown. The valid landing area can be determined based on the total air-time and other considerations. The other considerations can include: decelerating or accelerating requirements based on dead-man zone (H-V curve) design shown in FIG. 3B from the autorotation entry point, and lateral turn energy consumption for changes of the total air-time. In some cases, pre-arranged autorotation airspeed can also be used to determine the valid landing area. Within the landing area, the control system 130 can employ the LIDAR scanning system 164 or GPS terrain system or both to find one or more landing spots, e.g., a flat, even or semi-even suitable landing spot.

In some implementations, the control system 130 includes an algorithm for autorotation landing. In response to detection of engine failure, the control system 130 can initiate the autorotation by executing the algorithm. In a particular implementation, as discussed in details below, the algorithm coverts a portion of the potential energy to rotor inertia rotating energy using rotor autorotation function or rotor windmill function to maintain 100% RPM.

The total energy of an aircraft in power condition contains three portions:

$$E_{Total}=E_{Rotor}^{0}+P_{E}^{0}+K_{E}^{0}=E_{Rotor}^{1}+P_{E}^{1}+K_{E}^{1} \quad (1)$$

where the energy of the rotor $E_{Rotor}^{0}$ is provided from the engines, $P_{E}^{0}$ is the aircraft potential energy, and $K_{E}^{0}$ is the aircraft kinematic energy. Assuming the aircraft is in healthy with altitude hold steady state level flight without any side velocity, the three portions of the total energy become:

$$\begin{cases} K_E^0 = \frac{1}{2}m \cdot V_{x0}^2 \\ P_E^0 = m \cdot g \cdot H_0 \\ E_{Rotor}^0 = \frac{1}{2}I_R \Omega_0^2 \end{cases} \quad (2)$$

where $V_{x0}$ is the forward speed at altitude hold steady state, and $H_0$ is the altitude above the ground. Therefore, the initial vertical speed is at altitude hold, $V_{z0}=0$. The potential energy is computed based on the current altitude of $H_0$. Note that the rotor energy $E_{Rotor}^{0}$ is provided from the engines as a constant RPM of $\Omega_0$.

When losing the engines, e.g., at the event of duel engine failure, the three portions of the total energy change to $$\begin{cases} K_E^1 = \frac{1}{2}m \cdot V_{x1}^2 \\ P_E^1 = m \cdot g \cdot H_1 \\ E_{Rotor}^1 = \frac{1}{2}I_R \Omega_1^2 \end{cases} \quad (3)$$

It is hard to maintain the aircraft level flight without engine powers. Aircraft RPM without any collective lever retraction (potential energy converted to rotor energy) will cause rotorcraft RPM reduction, which will result in aircraft stall. To avoid the aircraft stalling, the new rotor RPM variable $\Omega_1$ can be brought back to 100% RPM before it reaches the RPM stalling condition, which is approximately around 80% of engine healthy RPM $\Omega_0$, e.g., 100% RPM. With rotor RPM maintaining 100%, the autorotation maneuver for dual engine failure can then be used until a final approach for flare control.

Before reaching final flare control, the rotor RPM can be adjusted or increased by using collevel lever (potential energy conversion to rotor energy) from 100% to 107% to achieve more rotor energy for final flare control. The maximum rotor RPM of 107% for autorotation is a rotorcraft-dependent pre-specified value, which is subject to change from one aircraft to the other aircraft. During the final flare control, the aircraft can change the rotor energy for final touchdown by reducing the rotor RPM from 107% to 80%. In this way, the aircraft can adjust landing in a landing point (e.g., forward, middle, or afterward) within the landing spot.

Assuming the aircraft altitude is high enough, the initial entry point can be assumed to convert the potential energy into rotor engine as $$\Delta P_E = P_E^0 - P_E^1 = \Delta E_{Rotor} = E_{Rotor}^0 - E_{Rotor}^1 \quad (4)$$

$$mg \cdot (H_0 - H_1) = \frac{1}{2}I_R \cdot (\Omega_0^2 - \Omega_1^2) \quad (5)$$

During final touchdown, the aircraft needs to be slowed down to a safe landing airspeed such that crashed landing can be avoided. During this maneuver, the kinematic energy also needs to be converted to rotor energy and potential energy, while bringing a drop of potential energy back to an acceptable level. In this flare control and final touchdown maneuver, the collective lever will be brought back to a certain lever to control the aircraft vertical velocity descending rate to a small descent value or zero (said 0 to −5 ft/sec).

The potential energy, $P_E = m \cdot g \cdot \Delta H$, can be transferred to the kinematic energy, $K_E = \frac{1}{2}m \cdot (\Delta V_{total}^2)$ on either axis X, Y, Z or any combination of the axes. In some cases, to make autorotation successful, it is required to transfer the majority of potential energy $P_E$ on the vertical axis to the rotor energy.

During descending, the total speed $V_{total}$ can be expressed as:

$$V_{total}=\sqrt{V_x^2 + V_z^2} \text{ assuming that } V_y = 0 \quad (6)$$

Therefore, the steady state descending angle $\xi$ on the (X, Z) plane plot can be determined:

$$\xi = \tan^{-1}\left(\frac{V_z}{V_x}\right) \quad (7)$$

Note that the airspeed quickness couples with aircraft initial pitching attitude to reach the steady state airspeed $V_x$. As noted above, at the same time, the aircraft is supposed to maintain its RPM to approximate 100% so that its rotor energy in the autorotation performance is reserved for final approach.

The total air-time to touchdown $t_f$ can be determined by calculating a time $t_1$ for initially generating an optimal autorotation vertical speed $V_{zf}$ and a time $t_2$ for steady-state descending to the ground at the optimal autorotation vertical speed $V_{zf}$. In some examples, the optimal autorotation steady state vertical descent speed $V_{zf}$ is around −35 ft/second, e.g., according to a particular VTOL autorotation speed requirement.

The total descending time $t_f$ can be also approximately determined as $$t_f = \sqrt{\frac{2 \cdot \Delta H}{g - A_{aero}}} \qquad (8)$$

where $A_{aero}$ the deceleration of the aerodynamic friction force during descending.

Figure 2A:
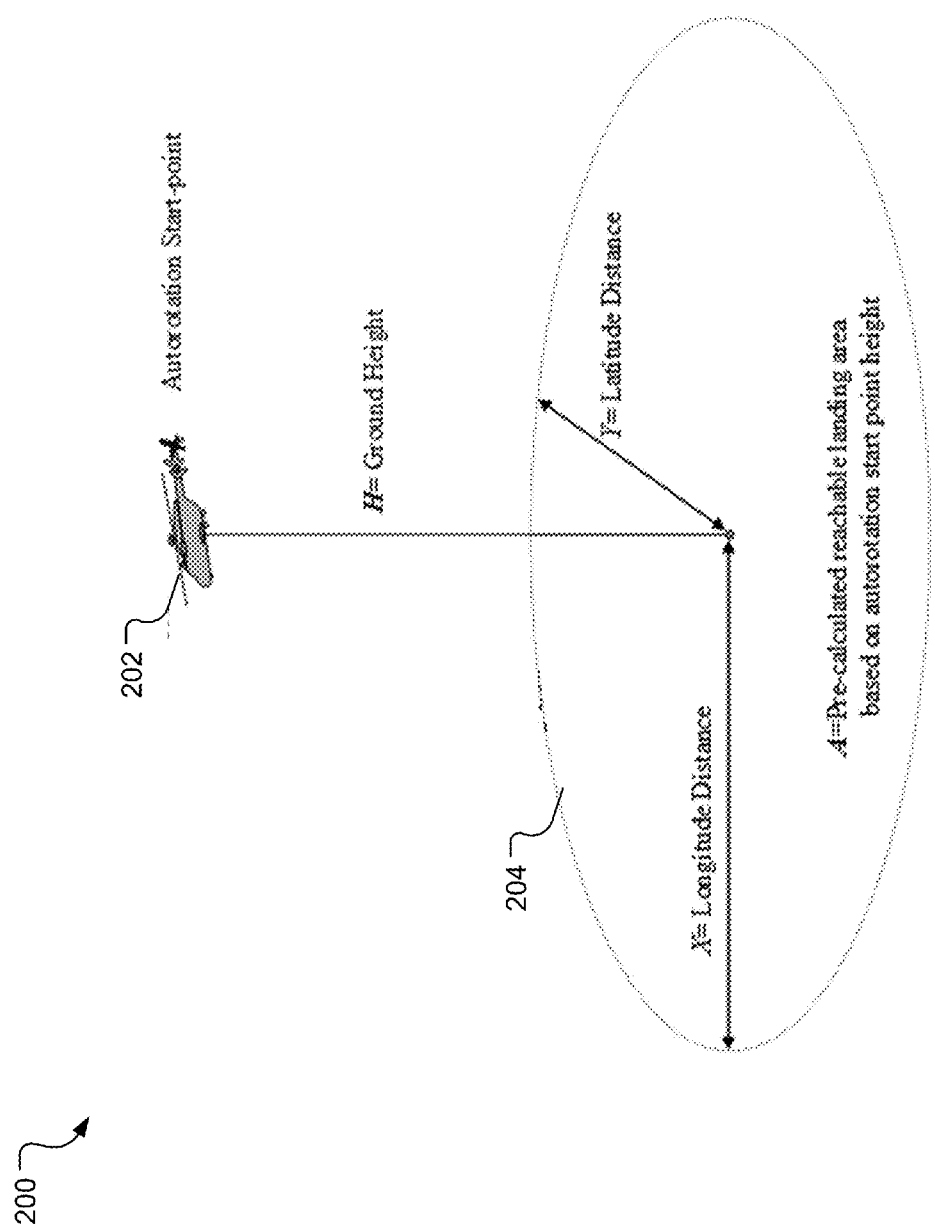
FIG. 2A is a schematic diagram of an example available landing area.

FIG. 2A is a schematic diagram 200 showing a relationship between aircraft height and landing area. A helicopter 202 in FIG. 2A is employed to illustrate the entire autorotation maneuver. In response to detection of engine failure of an aircraft 202, a control system in the aircraft 202, e.g., the control system 130 of FIGS. 1A and 1B, initiates an autorotation. At a time of initiating the autorotation, i.e., autorotation start point, the control system determines a number of flight characteristics and conditions, including ground height H and initial airspeed, and calculate an available landing area 204, e.g., area A with a longitude distance X and a latitude distance Y. The control system can calculate the landing area 204 based on the determined flight characteristics and conditions. In some examples, the control system determines a total air-time to touchdown, and then determines the landing area 204 at least partially based on the total air-time to touchdown.

Figure 2B:
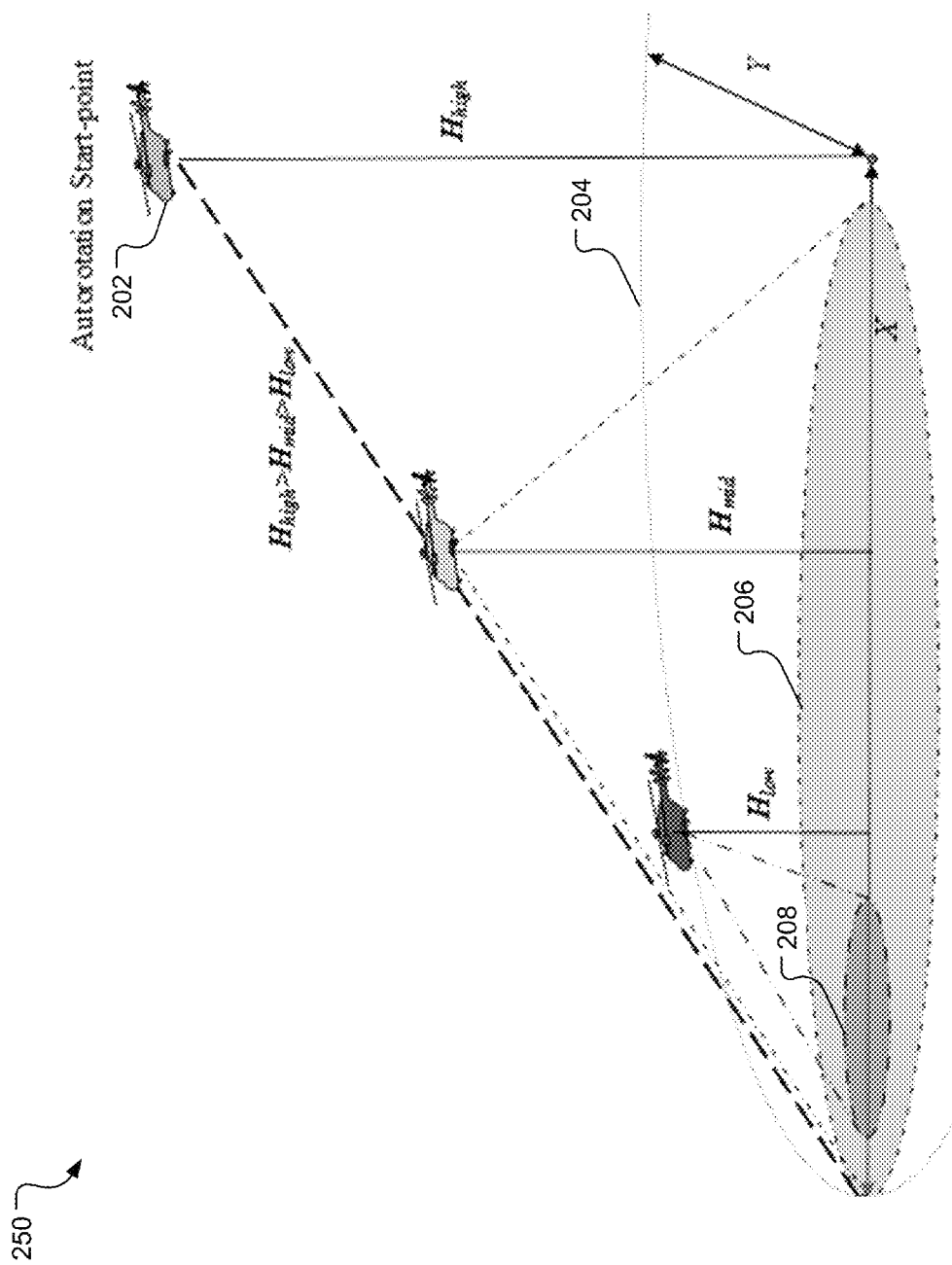
FIG. 2B is a schematic diagram of landing area selection with respect to altitude changes.

FIG. 2B is a schematic diagram 250 of landing area selection with respect to altitude changes. On each ground altitude, the selectable landing area can be automatically calculated by the control system so that the optimal landing area and available landing sites can be kept tracking. The control system can successively determine multiple geographic areas within which to land the aircraft while controlling the aircraft to land by autorotation. Each geographic area is determined at a lower altitude relative to a preceding geographic area, and each geographic area is smaller than the preceding geographic area.

The initial landing area 204 can be determined, e.g., immediately right after losing engine power. When the aircraft altitude H drops lower after quite a few seconds of initial autorotation entrance, e.g., from $H_{high}$ to $H_{mid}$ to $H_{low}$, the selectable landing area size A decreases, e.g., from area 204 to area 206 to area 208. In higher ground altitude, aircraft landing area can have left, right, and afterward areas to be considered. When the ground altitude becomes lower, the afterward landing selectable area may become unavailable. When the ground altitude is relatively low, the available landing spot can exist only at the forward direction with limit adjustment from the left and right heading areas. In this case, the aircraft 202 can have different landing options, e.g., landing quickly and shorter or landing slower and farther.

Figure 3A:
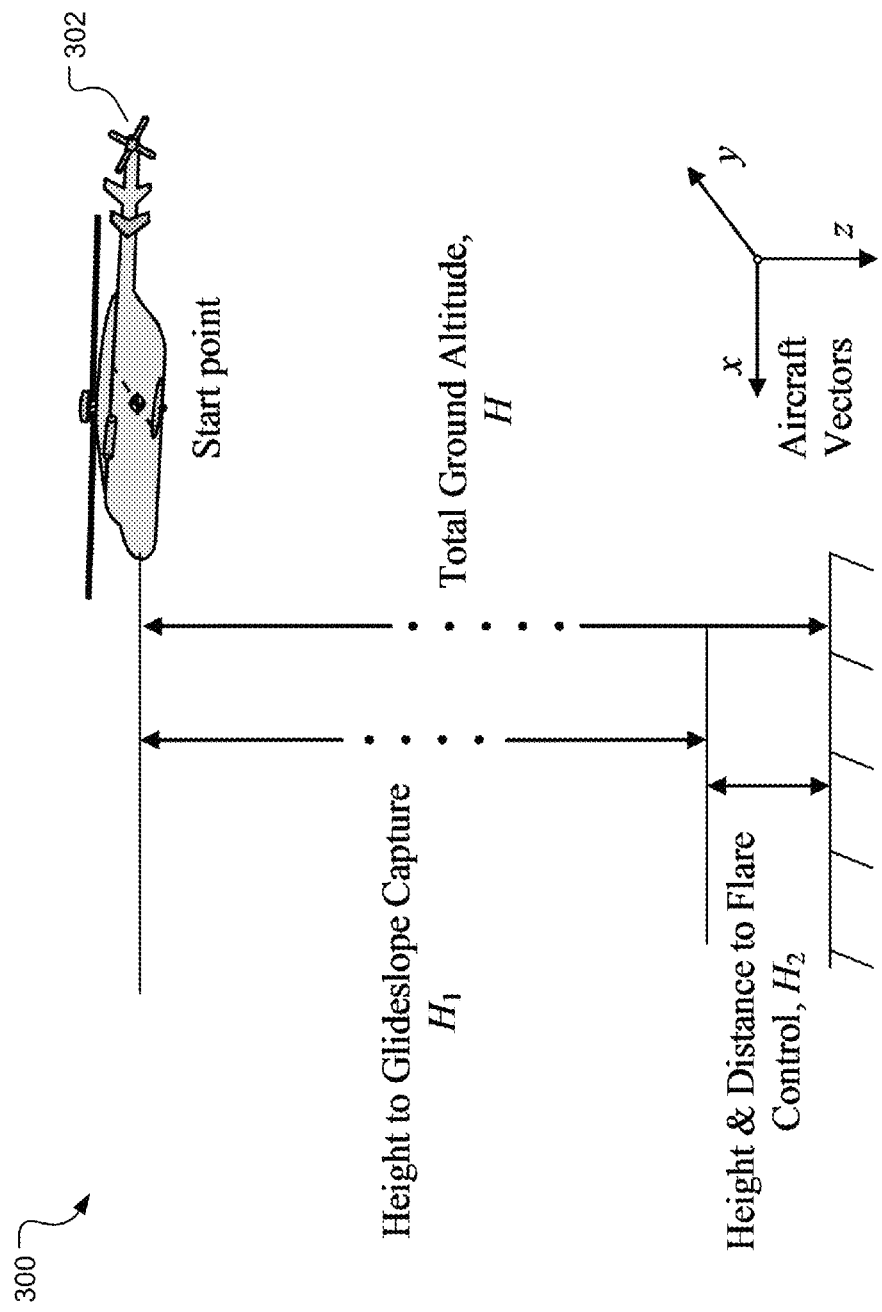
FIG. 3A is a schematic diagram of an example time scale design for autorotation.

FIG. 3A is a schematic diagram 300 of an example time scale design for autorotation landing of an aircraft 302. After determining a geographic area within which to land the aircraft 302 by autorotation, a control system, e.g., the control system 130 of FIGS. 1A and 1B, can control the aircraft 302 to land by autorotation within the suitable geographic area 204 in FIG. 2B. In some implementations, the control system generates a two-time scale method which contains glideslope capture and flare control. As illustrated in FIG. 3A, the total ground altitude H at autorotation start point can be divided into two parts: height $H_1$ for glideslope capture and height $H_2$ for flare control. Accordingly, the total air-time to touchdown can be also divided into two corresponding time periods: glideslope capture period and flare control period.

The control system can determine a glideslope angle and a flare control point for the aircraft 302 based at least in part on a number of flight characteristics and conditions at autorotation start point, including autorotation entry ground height, initial airspeed, and wind direction. The glideslope angle is an angle at which the aircraft descends during the glideslope capture period. The control system can determine the glideslope angle, e.g., based on equation 8. Therefore, the glideslope angle, time to reach the flare control and the altitude of flare control start point can all be determined. The flare control point is a transition point that the aircraft 302 is managed from the glideslope capture to the flare control. The control system can determine the flare control point based on airspeed and vertical landing speed. In some examples, the flare control point has a height of about 50 to 200 feet depending on flare control entry airspeed and final flare control ballooning altitude. Using the determined glideslope angle and flare control point, the control system can determine a flight path along which to descend the aircraft by autorotation.

Figure 3B:
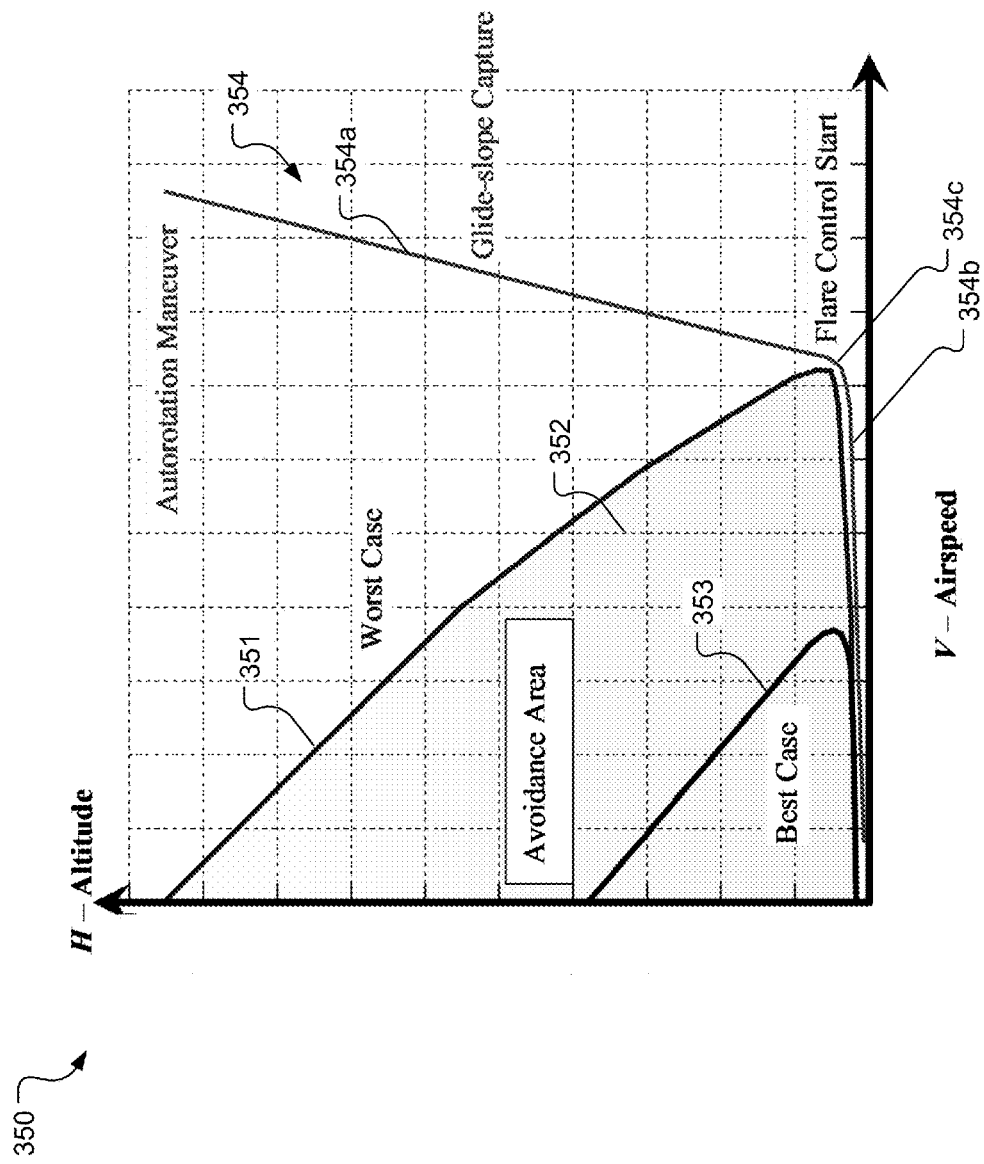
FIG. 3B is a schematic diagram of example Height-Airspeed (H-V) curves for autorotation.

FIG. 3B is a schematic diagram 350 of example H-V (Height-Airspeed) curves for autorotation. Curve 351 shows the worst case or avoidance area of a flight entry point for autorotation, while curve 353 shows the best case of a flight entry point for autorotation, and area 352 defined by curve 351 and curve 353 presents avoidance area within which an aircraft cannot be recovered. Curve 354 shows an example of flight path including glideslope capture 354a, flare control 354b, and a flare control point 354c at which the aircraft is managed from glideslope capture 354a to flare control 354b.

In some implementations, the control system stores, in a computer-readable storage device, multiple flight paths, multiple glideslope angles and multiple flare control points, each stored flight path associated with a corresponding stored glideslope angle and stored flare control point, e.g., the H-V curve 354. The H-V avoidance area 352 in autorotation maneuver can be also stored in the control system, e.g., using mapping technology. When the control system determines the two time scale arrangement shown in FIG. 3A using $H_1$ and $H_2$, the stored H-V curves and H-V avoidance area can be naturally considered and referred to.

The control system can compare the determined glideslope angle and the flare control point with the stored multiple glideslope angles and the stored multiple flare control points, respectively, and optionally adjust the determined glideslope angle and the flare control points for autorotation based on a result of the comparison. In some examples, the control system determines the glideslope angle and the flare control point by using the stored glideslope angles and flare control points together with the flight characteristics and conditions at autorotation start point.

Referring back to FIG. 3A, the control system can determine the following elements in $H_1$ time period (glideslope capture period): time to autorotation flare control point, an available landing area, available landing spots within the landing area, an optimal landing spot, e.g., with highest survivability, and an optimal flight path to a selected landing spot. The control system can also determine the following elements in $H_2$ time period (flare control period): static obstacles' size and height on-site to be avoided, moving objects' sizes, height and moving directions to be avoided, ground levelness or slope ground, wind direction and amplitude, and landing spot distance.

Figure 3C:
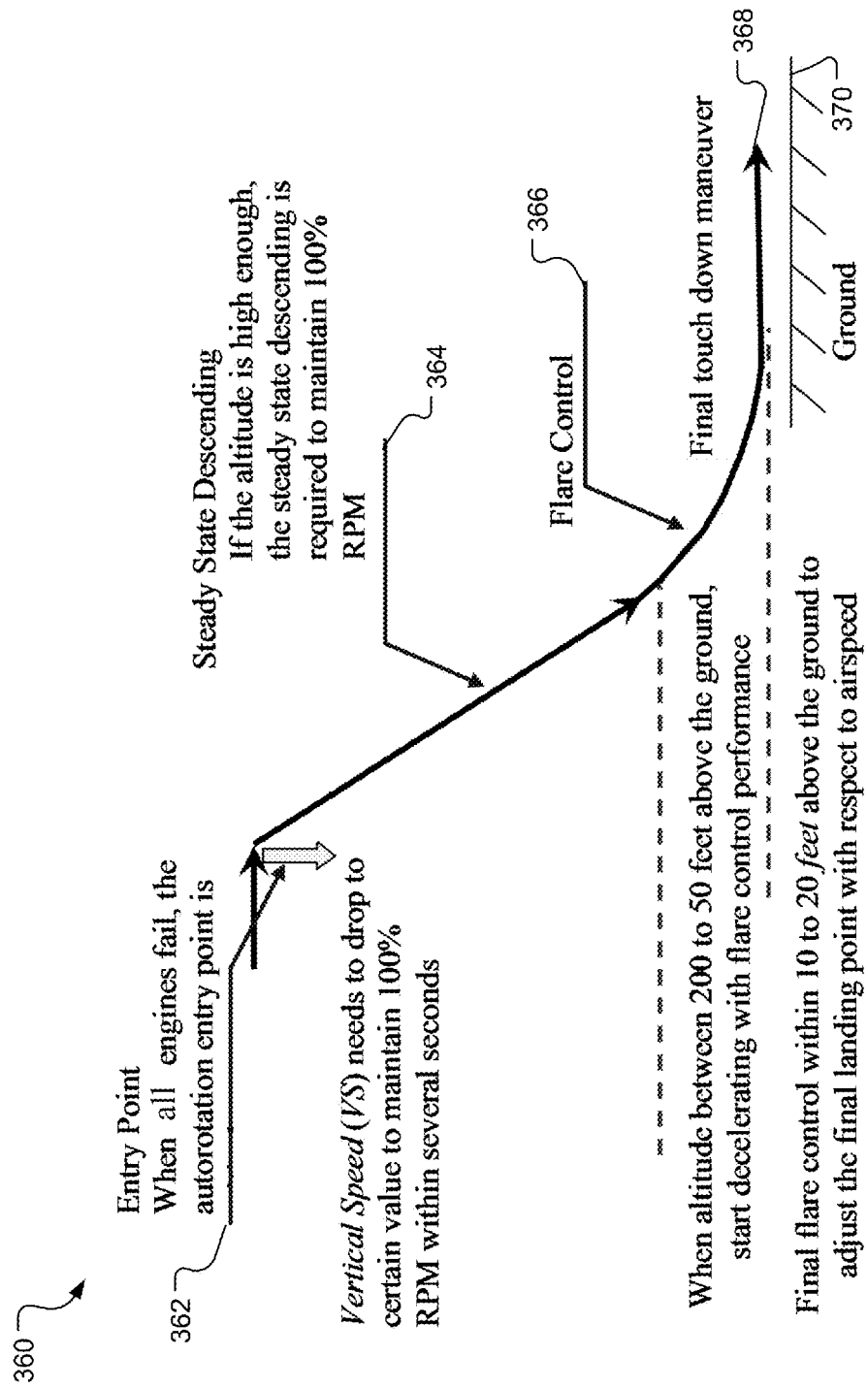
FIG. 3C is a schematic diagram of an example autorotation maneuver.

FIG. 3C shows an example autorotation maneuver 360. In response to detection of engine failure, e.g., when all engines fail, the control system initiates an autorotation of the aircraft at entry point 362. As noted above, vertical speed of the aircraft needs to drop to a certain value to maintain 100% RPM, e.g., within a couple of seconds. The control system determines a number of flight characteristics and conditions of the aircraft at the entry point 362, and determines a geographic area to land the aircraft by autorotation based on the number of flight characteristics and conditions. The control system can also determine a glideslope angle and a flare control point for the aircraft based on at least in part on the number of flight characteristics and conditions, and determine a flight path along which to descend the aircraft by autorotation.

During glideslope capture period 364, the aircraft keeps steady state descending with the determined glideslope angle. If the initial altitude at the autorotation entry point 362 is high enough, e.g., about 1,000 feet above the ground 370, the aircraft can maintain 100% RPM for steady state descending. When the altitude of the aircraft reaches the determined flare control point, e.g., between 200 to 50 feet above the ground 370, the aircraft starts decelerating by moving longitudinal control afterward and adjust collective up first and then down to enter flare control period 366. When the aircraft further descends to a height, e.g., within 10 to 20 feet above the ground 370, the aircraft is managed under final flare control and enters final touchdown maneuver 368 until the aircraft eventually lands on the ground 370.

In some implementations, the control system keeps monitoring the number of flight characteristics and conditions while controlling the aircraft to land by autorotation to determine changes to the number of flight characteristics and conditions, determines changes to the glideslope angle and the flare control point based on the changes to the number of flight characteristics and conditions, and modifies the flight path along which to descend the aircraft by autorotation based on the changes to the glideslope angle and the flare control point. In some examples, if the control system determines a presence of obstacles in the geographic area while controlling the aircraft to land by autorotation, e.g., using LIDAR technology, the control system modifies the flight path along which to descend the aircraft to avoid the obstacles.

Figure 4:
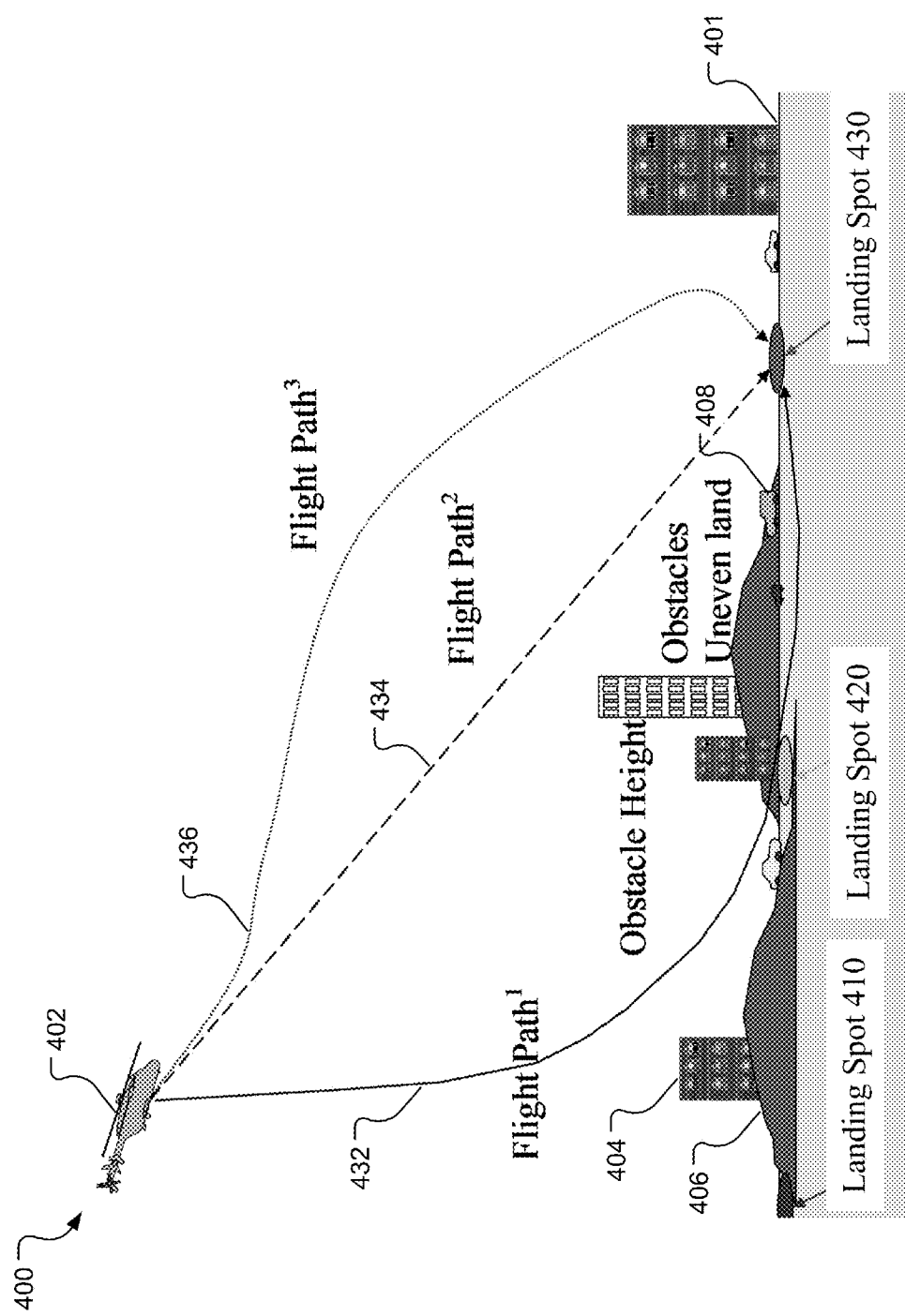
FIG. 4 is a schematic diagram of selection of optimal landing spot and flight path for autorotation.

FIG. 4 is a schematic diagram 400 of selection of optimal landing spot and flight path for autorotation landing. As noted above, a control system of an aircraft 402, e.g., the control system 130 of FIGS. 1A and 1B, can determine a geographic area within which to land the aircraft 402 by autorotation based on flight characteristics and conditions at autorotation entry point. Within the geographic area, the control system can further determine total available landing spots and sizes of individual landing spots, 410, 420, and 430.

As illustrated in FIG. 4, the control system can determine obstacle items such as buildings 404, uneven lands 406, and moving objects 408, on the ground 401, e.g., by using LIDAR technology and GPS terrain system. In some examples, the control system selects 420 to 430 landing spots, among which some have obstacles in the way, some are too small, and some have traffic in the landing spots.

In some implementations, the control system uses survivability rate to determine which landing spot to be used as the final touchdown point. The survivability rate can depend on at least one of the following factors: total available obstacle items on the ground around a selected landing spot, individual size of obstacle items in height in the selected landing spot, wind amplitude and direction in the selected landing spot, total available flare distance in the selected landing spot, land levelness, possible flight paths for final touchdown. In this example, the control system determines landing spots 410, 420 and 430 in the landing geographic area, and further determines the optimal landing spot to be landing spot 430.

In some implementations, after the control system determines a landing spot within the geographic area on which to land the aircraft by autorotation, the control system can further determine at least one alternative landing spot within the geographic area on which to land the aircraft by autorotation. While controlling the aircraft to land the aircraft by autorotation within the geographic area, if the control system determines that the determined landing spot is unavailable to land the aircraft, the control system can control the aircraft to land the aircraft by autorotation on the alternative landing spot, such as 420.

Once the landing spot, e.g., landing spot 430, is selected, the control system can generate a number of flight paths, e.g., flight paths 432, 434 and 436, for the selected landing spot. The flight paths can have corresponding landing points (e.g., forward, middle, or afterward) in the landing spot. The control system can analyze the generated flight paths and determine an optimal flight path. In some implementations, the control system determines the optimal flight path by using at least one of the following criteria: obstacles on the flight path per its size and height per glideslope angle requirement, obstacles on the flight path per its size and height during final flare control area, wind direction and speed, run way distance requirement for autorotation landing with speed, and ground smoothness and ground slope.

Figure 5:
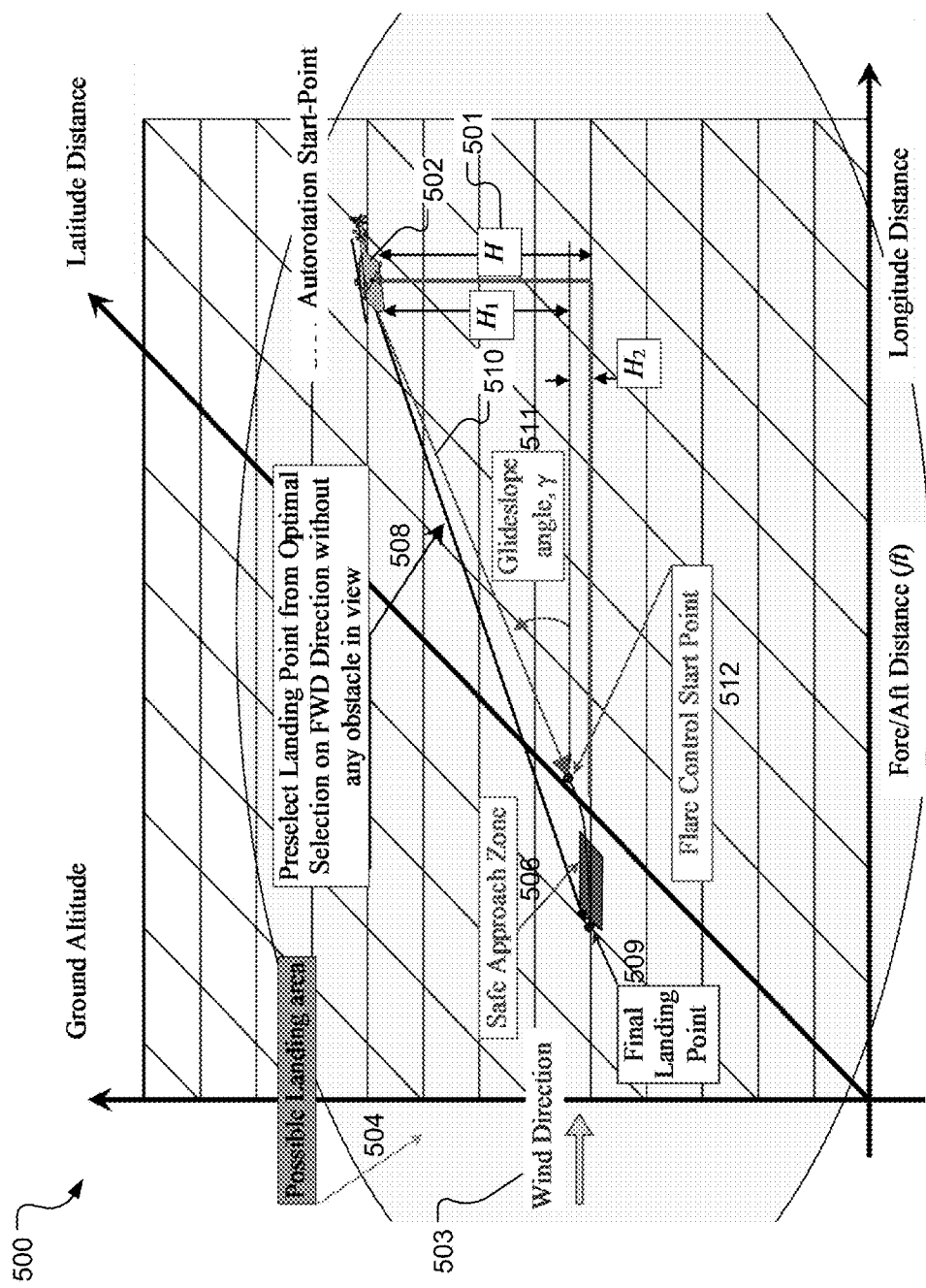
FIG. 5 is a schematic diagram of an example autorotation maneuver.

FIG. 5 is a schematic diagram 500 of an example autorotation maneuver. In response to detecting an event of engine failure of an aircraft 502, a control system of the aircraft 502, e.g., the control system 130 of FIGS. 1A and 1B, can initiate an autorotation and determine a number of flight characteristics and conditions at autorotation start point, including aircraft altitude H 501, wind direction 503, and aircraft airspeed. Based on the flight characteristics and conditions, the control system determines a possible landing area 504 with which to land the aircraft 502 by autorotation and controls the aircraft to land by autorotation within the landing area 504.

As noted above, the control system can determine a number of available landing spots and choose an optimal landing spot, e.g., a safe approach zone 506, within the determined landing area 504. In some implementations, the control system orients the aircraft 502 to face headwind based on the wind direction 503. The control system can pre-select a landing point on forward direction 508. Once the optimal landing spot is selected, the control system can determine an optimal flight path 510, e.g., by determining a glideslope angle 511 and a flare control point 512 based on the flight characteristics and conditions and optionally stored H-V curves as shown in FIG. 3B. The aircraft 502 can then descend by autorotation along the flight path 510 to a final landing point 509.

Figure 6:
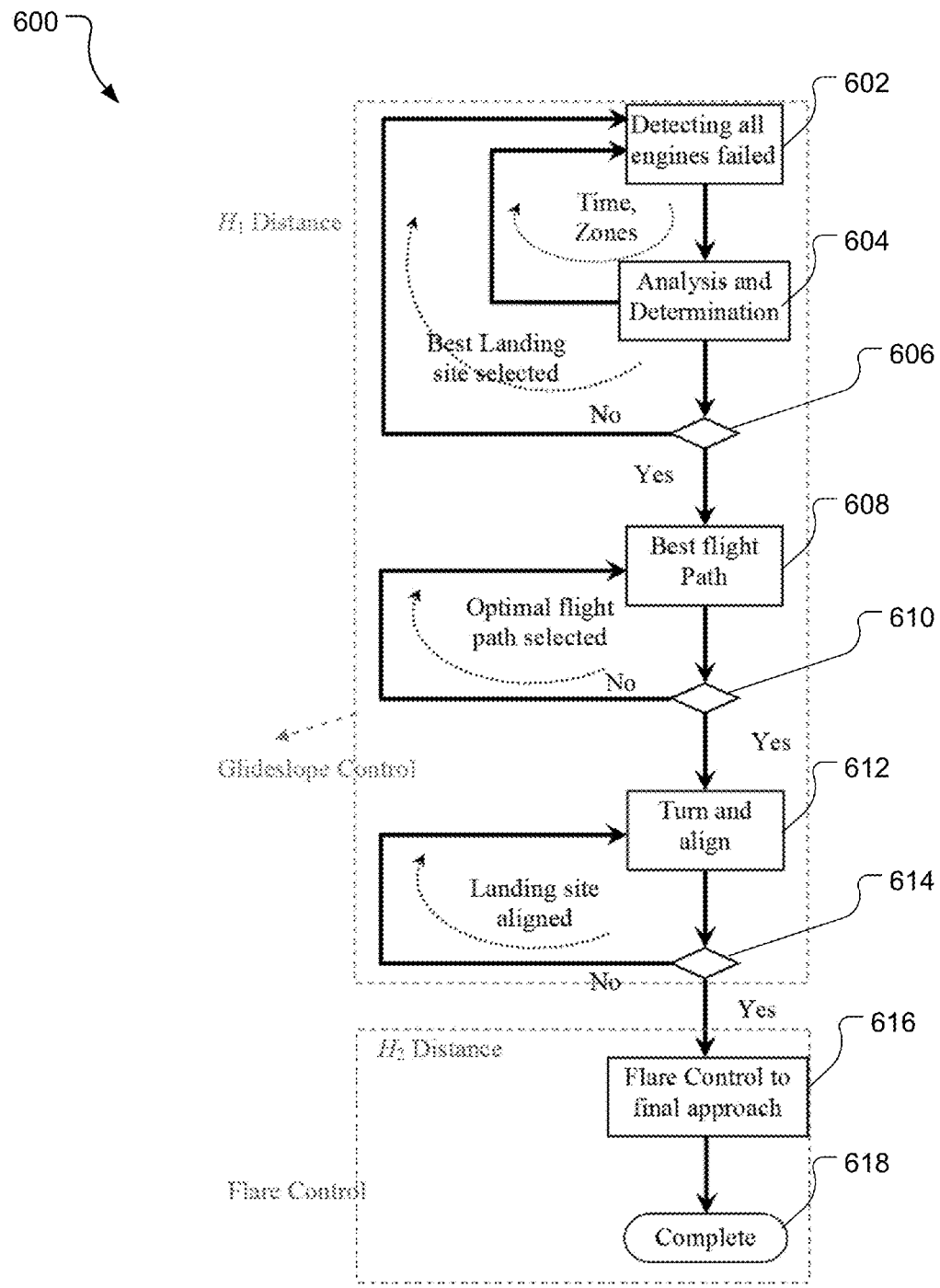
FIG. 6 is a flowchart of an example process according to an example implementation of the disclosure.

FIG. 6 is a flowchart of an example process 600 according to an example implementation of the disclosure. The process 600 can be performed by a control system, e.g., the control system 130 of FIGS. 1A and 1B. The control system can include one or more processors and a computer-readable medium storing instructions executable by the one or more processors to perform the process 600.

At 602, failure of all engines is detected. The aircraft includes one or more engine sensors, e.g., the engine/drive control devices 162 of FIG. 1B, which can provide information on engines such as whether all engines have failed. The control system can keep monitoring whether all engines have failed by processing the received information from the engine sensors. In response to detecting all engines have failed, the control system can initiate an autorotation and determine a number of flight characteristics and conditions of the aircraft at a time of initiating the autorotation. The number of flight characteristics and conditions includes an aircraft altitude (e.g., ground height), an aircraft velocity (e.g., airspeed), and local wind direction. The aircraft can immediately start descending by pushing collective down more than a certain value to maintain 100% rotor RPM. The aircraft can accelerate or decelerate based on initial entry airspeed.

At 604, the control system analyzes the number of flight characteristics and conditions and determines a geographic area with which to land the aircraft by autorotation. The control system can determine a total air-time to touchdown, e.g., based on the entry ground height. In this process, the function of maintaining 100% RPM and the mission of determining geographic area and total air-time calculation can take place simultaneously. In some implementations, the control system keeps monitoring the conditions of all engines. By determining the landing geographic area, the control system can go back to step 602 to check whether all engines still fail or at least one of the engines goes back to work. If the control system determines that all engines still fail, the control system continues to execute autorotation maneuver. The entire time of processing the above functions, mission, calculation and re-confirming the engine failure can take place approximately two real-time frames of flight control computer calculation, which is approximate 0.04 seconds.

The control system determines a landing spot within the determined geographic area on which to land the aircraft by autorotation. The control system can employ LIDAR and/or GPS terrain system of the aircraft to find a number of landing spots within the geographic area and sizes of individual landing spots. The control system can select the best landing spot based on one or more factors as noted above, e.g., selecting a landing spot with highest survivable rate.

At 606, the control system determines whether the best landing spot has been selected. If the best landing spot has not been selected, the process goes back to step 602. If the best landing spot has been selected, the process continues to step 608. The step of deciding the optimal landing site being selected can take less than one second.

At 608, an optimal flight path is determined. The control system can generate a number of flight paths for the selected landing spot, e.g., by determining glideslope angles and flare control points based on the flight characteristics and conditions and stored H-V curves, and then determine the optimal flight path based on one or more criteria as noted above, including wind condition, ground blockages and approach angles.

At 610, the control system determines whether the optimal flight path has been selected. If the optimal flight path has not been selected, the process goes back to step 608. If the optimal flight path has been selected, the process continues to step 612. The process time from engine failure to optimal flight path selection can be less than two seconds so that the aircraft turning and alignment can occur with aircraft autorotation descending.

At 612, the control system controls the aircraft to turn and align to the selected landing spot. The control system can turn to align the aircraft to face headwind on a forward approach. The control system keeps monitoring the flight characteristics and conditions to determine whether the aircraft is aligned towards the selected landing spot at 614. If the control system determines that the aircraft is not aligned towards the landing spot, the process goes back to step 612 and the control system adjusts the aircraft, e.g., based on updated flight characteristics and conditions. If the control system determines that the aircraft is aligned towards the landing spot, the control system controls the aircraft to keep descending.

The selected flight path can include a glideslope angle and a flare control point. The control system controls the aircraft to descend with glideslope capture maneuver, e.g., by steady state descending with the glideslope angle, from the initial altitude to the flare control point for $H_1$ distance. Steps 602 to 614 are executed during the glideslope capture period. The control system can also controls the aircraft to descend with the flare control maneuver from the flare control point to the final landing point for $H_2$ distance.

When the aircraft descends to the flare control point of the selected flight path, the control system controls the aircraft into flare control maneuver. At 616, the aircraft is under flare control to final touchdown. In some examples, the control system controls final forward touchdown speed lower than 20 knots, final descending velocity Vz smaller than −5 ft/second, and final touchdown pitch angle within a predetermined design limit (estimated to be less than ten degrees for all rotorcrafts) to avoid the tail down first. The control system can also control a taxi distance within a runway limit. The process 600 ends at 618 when the aircraft eventually lands on the selected landing spot.

Figure 7:
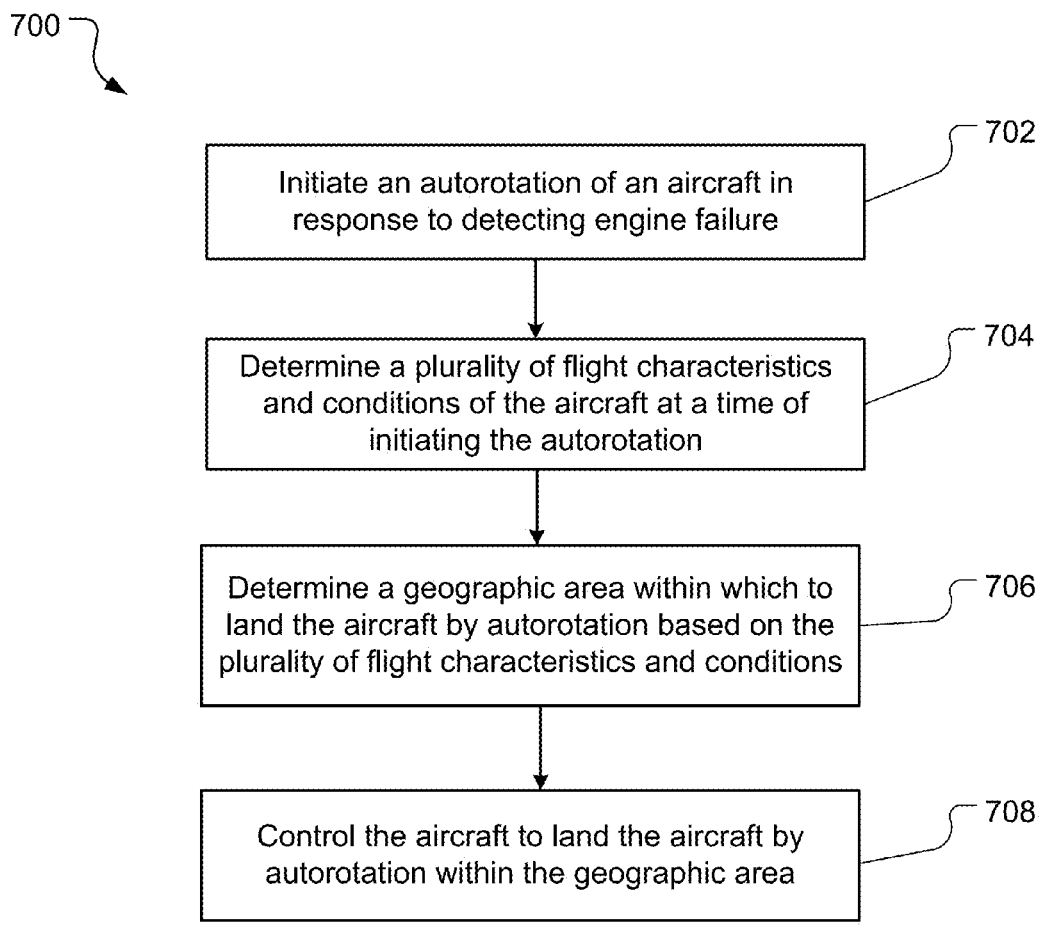
FIG. 7 is a flowchart of another example process according to an example implementation of the disclosure.

FIG. 7 is a flowchart of another example process 700 according to an example implementation of the disclosure. The process 700 can be performed by a control system, e.g., the control system 130 of FIGS. 1A and 1B. The control system can include one or more processors and a computer-readable medium storing instructions executable by the one or more processors to perform the process 700.

At 702, the control system initiates an autorotation of the aircraft in response to detecting all engine failure. The control system can receive information of all engines from one or more engine sensors on the aircraft and analyze the information to determine whether all the engines have failed. In some examples, the control system initiates the autorotation by executing an algorithm.

At 704, the control system determines a number of flight characteristics and conditions of the aircraft at a time of initiating the auto-rotation, the number of flight characteristics and conditions comprising an aircraft altitude, an aircraft velocity, and wind direction. The control system can receive flight characteristics and condition signals from a number of flight conditions sensors mounted on-board the aircraft, each flight condition sensor configured to sense at least one of the number of flight characteristics and conditions. In some examples, the control system receives flight condition information from a data processing apparatus of a ground control station communicatively connected to the control system. The ground control station can receive flight data from the control system and video/image data from LIDAR scanning system and process the received flight data and video/image data to generate control commands that can be transmitted to the control system for controlling the aircraft.

At 706, the control system determines a geographic area within which to land the aircraft by autorotation based on the number of flight characteristics and conditions. The control system can successively determine multiple geographic areas within which to land the aircraft while controlling the aircraft to land the aircraft by autorotation, each geographic area determined at a lower altitude relative to a preceding geographic area, each geographic area smaller than the preceding geographic area.

In some implementations, determining the geographic area within which to land the aircraft by autorotation based on the number of flight characteristics and conditions comprises determining a landing spot within the geographic area on which to land the aircraft by autorotation. The control system can determine a number of landing spots within the geographic area and select an optimal landing spot based on one or more factors. In some examples, the control system further determines at least one alternative landing spot within the geographic area on which to land the aircraft by autorotation. While controlling the aircraft to land the aircraft by autorotation within the geographic area, if the control system determines that the determined landing spot is unavailable to land the aircraft, the control system can control the aircraft to land the aircraft by autorotation on the alternative landing spot in response to determining that the determined landing spot is unavailable to land the aircraft.

At 708, the control system controls the aircraft to land the aircraft by autorotation within the geographic area. The control system can manage the aircraft under glideslope capture and flare control, as discussed above. The control system can determine a glideslope angle and a flare control point for the aircraft based at least in part on the number of flight characteristics and conditions, and determine a flight path along which to descend the aircraft by auto-rotation.

In some examples, the control system stores, in a computer-readable storage device, multiple flight paths, multiple glideslope angles and multiple flare control points, each stored flight path associated with a corresponding stored glideslope angle and stored flare control point. The control system can compare the determined glideslope angle and the flare control point with the multiple glideslope angles and the multiple flare control points, respectively. In some cases, the control system adjusts the determined glideslope angle the flare control point based on a result of the comparison.

The control system can monitor the number of flight characteristics and conditions while controlling the aircraft to land the aircraft by autorotation to determine changes to the number of flight characteristics and conditions, determine changes to the glideslope angle and the flare control point based on the changes to the number of flight characteristics and conditions, and modify the flight path along which to descend the aircraft by autorotation based on the changes to the glideslope angle and the flare control point.

The control system can use LIDAR system with its image function, e.g., the LIDAR scanning system 164 of FIG. 1B, to monitor objects in the geographic area or within the selected landing spot. If the control system determines a presence of obstacles in the geographic area using LINDA image while controlling the aircraft to land the aircraft by autorotation, the control system can redefine and modify the flight path along which to detour, ascend and descend the aircraft to avoid the obstacles.

In some examples, the control system determines wind direction at autorotation start point and controls the aircraft to face headwind based on the wind direction, e.g., into the wind using the (turn and align) 602 algorithm shown in FIG. 6 to improve survivability. The control system can control the aircraft to land the aircraft by autorotation within the geographic area without the pilot intervention.

In some implementations, the control system includes standby emergency control function that enables the aircraft, e.g., a UAV, to make its decision changes due to emergency condition occurrence when the aircraft is in the final approach and close to the ground. During the entire air-time to touchdown, the aircraft can keep calculating its reduced air-time, determine the reduced available landing area and reduced available landing spots, and calculate the optimal landing spot and optimal flight path for the selected landing spot and second available landing spot and second optimal flight path for the second available landing spot. During the final approach, when one or more moving objects move into the selected landing spot, the standby emergency control function can be triggered so that the aircraft can switch to the second optimal flight path to land towards the second optimal landing spot, e.g., by landing quicker or landing away from the moving objects or both.

Figure 8:
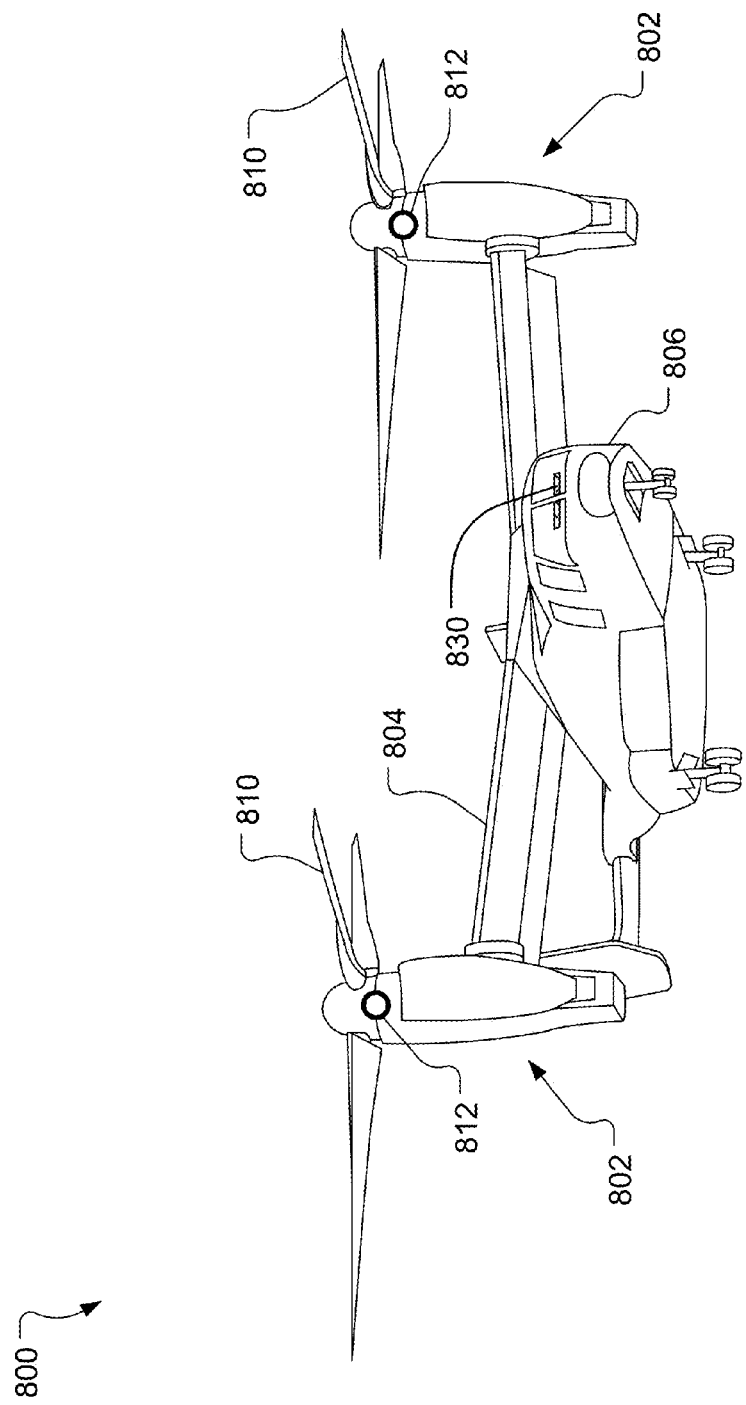
FIG. 8 is a schematic diagram of another example aircraft.

As another example aircraft, FIG. 8 shows a schematic diagram of an example tiltrotor aircraft 800. The aircraft 800 includes a fuselage 806 with attached wings 804. Nacelles 802 are carried at the outboard ends of the wings 804 and are rotatable between the helicopter-mode position shown and a forward-facing airplane-mode position (not shown). The nacelles 802 carry engines and transmissions for powering rotor systems 810 in rotation. An engine can be an internal combustion engine, an electrical power source and associated motor, or any other suitable technique for the powering rotor system 810. The engine supplies torque to the rotor system 810 via a gearbox system 812. The aircraft 800 can also include a control system 830 for controlling aircraft flight as well as autorotation landing. The control system 830 can be similar to the control system 130 of FIGS. 1A and 1B.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, a universal serial bus flash drive or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., flight control computer, aircraft mission computer, a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other, similar to relationship of an aircraft and ground control station using satellite wireless for communication, and typically interact through a communication network, such as Internet, Ethernet, wireless, satellite communication channel, etc. The relationship of client and server arises by virtue of computer programs running on the respective computers and having a client-server relationship to each other. In some implementations, a server transmits data (e.g., an HTML page, or any Java or binary format) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what can be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims.

What is claimed is:

1. A method performed by a data processing apparatus, the method comprising:

initiating, by the data processing apparatus, an autorotation of an aircraft in response to detecting engine failure;

determining, by the data processing apparatus, a plurality of flight characteristics and conditions of the aircraft at a time of initiating the autorotation, the plurality of flight characteristics and conditions comprising an aircraft altitude, an aircraft velocity, and wind direction;

determining, by the data processing apparatus, a geographic area within which to land the aircraft by autorotation based on the plurality of flight characteristics and conditions; and controlling, by the data processing apparatus, the aircraft to land the aircraft by autorotation within the geographic area.

2. The method of claim 1, wherein controlling the aircraft to land the aircraft by autorotation within the geographic area comprises:

determining a glideslope angle and a flare control point for the aircraft based at least in part on the plurality of flight characteristics and conditions;

determining a flight path along which to descend the aircraft by autorotation.

3. The method of claim 2, wherein determining the flight path along which to descend the aircraft by autorotation comprises:

storing, in a computer-readable storage device, a plurality of flight paths, a plurality of glideslope angles and a plurality of flare control points, each stored flight path associated with a corresponding stored glideslope angle and stored flare control point; and comparing the determined glideslope angle and the flare control point with the plurality of glideslope angles and the plurality of flare control points, respectively.

4. The method of claim 2, further comprising:

monitoring the plurality of flight characteristics and conditions while controlling the aircraft to land the aircraft by autorotation to determine changes to the plurality of flight characteristics and conditions;

determining changes to the glideslope angle and the flare control point based on the changes to the plurality of flight characteristics and conditions; and modifying the flight path along which to descend the aircraft by autorotation based on the changes to the glideslope angle and the flare control point.

5. The method of claim 2, further comprising:

determining a presence of obstacles in the geographic area while controlling the aircraft to land the aircraft by autorotation; and modifying the flight path along which to descend the aircraft to avoid the obstacles.

6. The method of claim 1, wherein controlling the aircraft to land the aircraft by autorotation within the geographic area comprises orienting the aircraft to face headwind based on the wind direction.

7. The method of claim 1, wherein determining a geographic area within which to land the aircraft by autorotation based on the plurality of flight characteristics and conditions comprises successively determining a plurality of geographic areas within which to land the aircraft while controlling the aircraft to land the aircraft by autorotation, each geographic area determined at a lower altitude relative to a preceding geographic area, each geographic area smaller than the preceding geographic area.

8. The method of claim 1, wherein determining the plurality of flight characteristics and conditions comprises receiving flight condition signals from a plurality of flight characteristics and conditions sensors mounted on-board the aircraft, each flight condition sensor configured to sense at least one of the plurality of flight characteristics and conditions.

9. The method of claim 8, further comprising receiving flight condition information from a data processing apparatus of a ground control station communicatively connected to the data processing apparatus.

10. The method of claim 1, wherein determining the geographic area within which to land the aircraft by autorotation based on the plurality of flight characteristics and conditions comprises determining a landing spot within the geographic area on which to land the aircraft by autorotation.

11. The method of claim 10, further comprising:

determining at least one alternative landing spot within the geographic area on which to land the aircraft by autorotation;

while controlling the aircraft to land the aircraft by autorotation within the geographic area, determining that the determined landing spot is unavailable to land the aircraft; and controlling the aircraft to land the aircraft by autorotation on the alternative landing spot in response to determining that the determined landing spot is unavailable to land the aircraft.

12. The method of claim 1, wherein controlling, by the data processing apparatus, the aircraft to land the aircraft by autorotation within the geographic area comprises controlling the aircraft without user intervention.

13. A computer-readable medium storing instructions executable by a data processing apparatus to perform operations comprising:

initiating, by the data processing apparatus, an autorotation of an aircraft in response to detecting engine failure;

determining, by the data processing apparatus, a plurality of flight characteristics and conditions of the aircraft at a time of initiating the autorotation, the plurality of flight characteristics and conditions comprising an aircraft altitude, an aircraft velocity, and wind direction;

determining, by the data processing apparatus, a geographic area within which to land the aircraft by autorotation based on the plurality of flight characteristics and conditions; and controlling, by the data processing apparatus, the aircraft to land the aircraft by autorotation within the geographic area.

14. The medium of claim 13, wherein controlling the aircraft to land the aircraft by autorotation within the geographic area comprises:

determining a glideslope angle and a flare control point for the aircraft based at least in part on the plurality of flight characteristics and conditions;

determining a flight path along which to descend the aircraft by autorotation.

15. The medium of claim 14, wherein determining the flight path along which to descend the aircraft by autorotation comprises:

storing, in a computer-readable storage device, a plurality of flight paths, a plurality of glideslope angles and a plurality of flare control points, each stored flight path associated with a corresponding stored glideslope angle and stored flare control point; and comparing the determined glideslope angle and the flare control point with the plurality of glideslope angles and the plurality of flare control points, respectively.

16. The medium of claim 14, the operations further comprising:
   monitoring the plurality of flight characteristics and conditions while controlling the aircraft to land the aircraft by autorotation to determine changes to the plurality of flight characteristics and conditions; and
   determining changes to the glideslope angle and the flare control point based on the changes to plurality of flight characteristics and conditions; and
   modifying the flight path along which to descend the aircraft by autorotation based on the changes to the glideslope angle and the flare control point.

17. The medium of claim 14, the operations further comprising:
   determining a presence of obstacles in the geographic area while controlling the aircraft to land the aircraft by autorotation; and
   modifying the flight path along which to descend the aircraft to avoid the obstacles.

18. The medium of claim 13, wherein determining the geographic area within which to land the aircraft by autorotation based on the plurality of flight characteristics and conditions comprises determining a landing spot within the geographic area on which to land the aircraft by autorotation.

19. The medium of claim 13, wherein controlling, by the data processing apparatus, the aircraft to land the aircraft by autorotation within the geographic area comprises controlling the aircraft without user intervention.

20. A system on-board an aircraft, the system comprising:
   a data processing apparatus; and
   a computer-readable medium storing instructions executable by the data processing apparatus to perform operations comprising:
      initiating, by data processing apparatus, an autorotation of an aircraft in response to detecting engine failure;
      determining, by the data processing apparatus, a plurality of flight characteristics and conditions of the aircraft at a time of initiating the autorotation, the plurality of flight characteristics and conditions comprising an aircraft altitude, an aircraft velocity, and wind direction;
      determining, by the data processing apparatus, a geographic area within which to land the aircraft by autorotation based on the plurality of flight characteristics and conditions; and
      controlling, by the data processing apparatus, the aircraft to land the aircraft by autorotation within the geographic area.

* * * * *